INVENTOR
Donald E. Marshall
BY Burgess, Ryan + Hicks
ATTORNEYS

July 24, 1951 D. E. MARSHALL 2,561,395

APPARATUS FOR VAPORIZING SOLUTIONS OR LIQUID MIXTURES AND PELLETING THE RESIDUES

Original Filed March 16, 1946 6 Sheets-Sheet 2

INVENTOR.
Donald E. Marshall
BY Burgess, Ryan + Hicks
ATTORNEYS

INVENTOR.
Donald E. Marshall
BY
Burgess, Ryan + Hicks
ATTORNEYS

July 24, 1951 D. E. MARSHALL 2,561,395

APPARATUS FOR VAPORIZING SOLUTIONS OR LIQUID MIXTURES AND PELLETING THE RESIDUES

Original Filed March 16, 1946 6 Sheets-Sheet 4

INVENTOR.
Donald E. Marshall
BY Burgess, Ryan & Hicks
ATTORNEYS

July 24, 1951 D. E. MARSHALL 2,561,395
APPARATUS FOR VAPORIZING SOLUTIONS OR LIQUID
MIXTURES AND PELLETING THE RESIDUES
Original Filed March 16, 1946 6 Sheets-Sheet 5

INVENTOR.
Donald E. Marshall
BY Burgess, Ryan & Hicks
ATTORNEYS

INVENTOR.
Donald E. Marshall
BY
Burgess, Ryan & Hicks
ATTORNEYS

Patented July 24, 1951

2,561,395

UNITED STATES PATENT OFFICE 2,561,395

APPARATUS FOR VAPORIZING SOLUTIONS OR LIQUID MIXTURES AND PELLETING THE RESIDUES

Donald E. Marshall, Summit, N. J.

Original application March 16, 1946, Serial No. 654,996. Divided and this application January 5, 1948, Serial No. 499

7 Claims. (Cl. 159—4)

1

This invention relates to apparatus for vaporizing and separating the volatile portions of solutions or liquid mixtures which also contain solids or non-volatile liquids. The separated solids are nucleated into pellets and removed as a classified product.

In using the apparatus, such mixtures or solutions as detergents, milk, brewed coffee, soups and friut juices are dehydrated more effectively than is possible by other known methods. Conversion of water or other liquid associated with the foregoing solutions to vapors, and separation of these vapors from the solids or product is accomplished in a manner which greatly lessens the destruction of flavors or keeping qualities of the product. Furthermore, the products or separated solids are pelleted and classified to a uniform size, density and structure.

The invention makes possible the known advantages of low temperature, negative pressure dehydration and because of the intensity of the treatment, produces superior results in economy of operation, size of equipment and character of product. The same is true of dehydration at normal pressures conducted in atmospheres of inert non-oxidizing carrier gases.

Another application of this invention is in separating volatile solvents from chemical solutions being converted to solid particles, such as final steps in the manufacture of plastic molding granules.

Another advantage of this invention to chemical processing is that of spreading non-volatile liquid-phase material microscopically thin upon inert or catalytic carrier particles while these particles are in complete gas suspension, virtually untouched by surrounding particles or walls and for a sufficient time to complete a chemical reaction in these liquid-phase films. This may be aided in some cases by the catalytic character of the carrier particle, and in all cases by the large surface area provided by the carrier particle stream. This chemical reaction, for example, may be the re-esterification of fatty-oils with methyl alcohol, thus yielding products of reaction such as methyl ester of fatty-oil and of glycerine which are both readily vaporizable. Then the separation of these vapors from the carrier solid particles and the fractional condensation of these gaseous products completes the process. Furthermore, such solids as those which discolor fatty-oils are collected as coating material on the carrier solid particles and these more heavily laden particles are removed for revivification during the recycling of these carrier particles.

2

With this invention rapid reactions in the liquid-phase can be greatly facilitated by conducting these liquid-phase reactions on the surfaces of carrier particles instead of much slower reactions and less complete actions with liquids in bulk. The type of liquid-phase reactions which are suitable to being promoted by this invention are those which yield vaporizable products.

The invention may be understood from the description in connection with the accompanying drawings in which Fig. 1 is a vertical section through an illustrative sprayer apparatus enclosed within a chamber and having a dust or particle separator in the upper portion of the chamber. Auxiliary units are shown diagrammatically in the lower right hand section of the drawing;

Figures 1, 4:
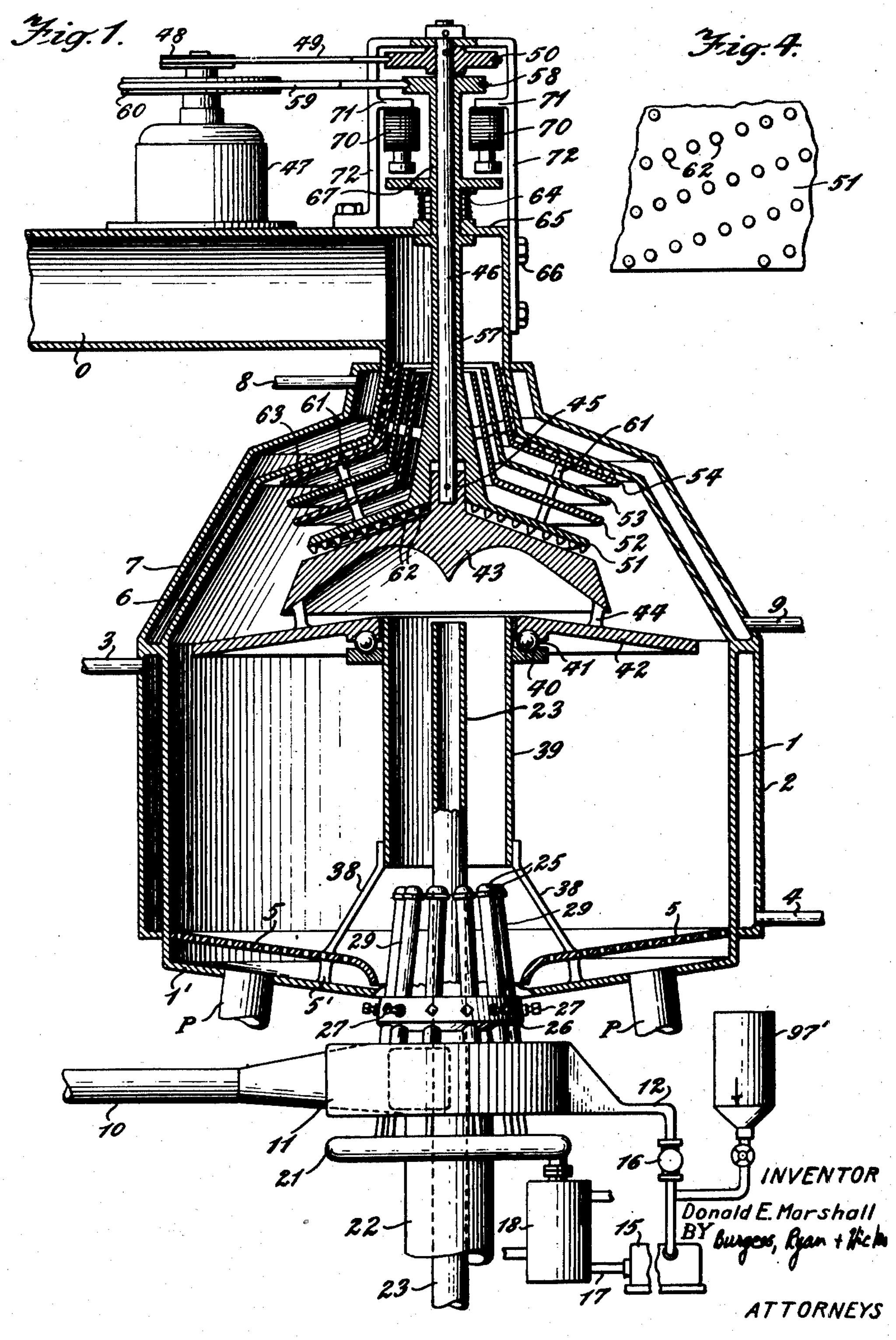
Fig. 4 is a side view on an enlarged scale showing a portion of Fig. 1.

In the drawings, reference character 1 indicates a chamber that has a sloping bottom wall 1'. The cylindrical portion of this chamber is jacketed by a jacket 2. An inlet 3 is provided for admitting cooling fluid to this chamber and an outlet 4 is provided for the fluid.

An annular perforated plate 5 that slopes downwardly towards its center is located in the chamber 1 and is spaced by spacers 5' a short distance from the bottom thereof. Pipes P for air under pressure enter the space between the plate 5 and bottom of container 1. The chamber 1 and jacket 2 are provided with spaced conically-shaped upper portions 6 and 7, respectively. An inlet 8 is provided for the space between the portions 6 and 7, and an outlet 9 is provided therefor.

An inlet 10 is provided for material to be treated. This inlet enters a toroid chamber 11 tangentially. A tangential outlet 12 (Fig. 3) is provided from the toroid chamber 11. A diverting plate 12′ for liquid is provided at the entrance of this outlet 12. A high-pressure liquid pump 15 (Fig. 2) is provided into which the outlet 12 enters. A filter screen 16 is provided in this outlet. An outlet 17 extends from the pump 15 to a heat exchanger 18 that is provided with heating tubes 19. A connection 20 extends from the heat exchanger 18 to a bustle 21 surrounding an outlet tube 22 which is concentric with the chamber 11. A smaller tube 23 (Fig. 1) is located concentric with the tube 22 and extends to the upper end of the cylindrical portion of chamber 1. Tube 23 serves to introduce solid particles to the chamber 1, particularly previously formed solid particles that have been withdrawn through tube 22 and stored or treated in a place not shown. As an example of such storage or treating place, reference may be made to copending applications Serial Number 624,681, filed October 26, 1945, and Serial Number 610,312, filed August 11, 1945. The lower portion of tube 23, of course, will be connected to such storage or treating space, and suitable means will be provided for conveying the particles through the tube to the chamber 1.

A plurality of upwardly-extending and inwardly inclined small tubes 24 (Fig. 2) extend from the bustle 21 into the lower portion of chamber 1. These tubes terminate in nozzle tips 34. A ring 26 integral with the bottom 1′ is provided around the tubes 29 and has set screws 27 for holding these tubes in assembled relation. The tubes 24 extend through tubes 29. A radial horizontal inward tubular extension 30 of the chamber 11 connects with a vertical tubular extension 29 which surrounds the tubes 24. Tubes 24 extend from the bustle 21 almost to the upper ends of the tubes 29 and have tight fits in the lower portion of these tubes 29, leaving spaces 33 around the tubes 24 from the extension 30 to the upper ends of these tubes, thus providing passageways for gases which enter the chamber 11. Nozzle tips 34 are provided at the upper ends of the tubes 24. Openings 35 are provided through the tubes 29 to establish communication with the chamber 11 through the tubular extensions 30 and the spaces 33 between the tubes 24 and 29.

Brackets 38 (Fig. 1) are provided on the perforated plates 5 to support a large tube 39 with which the inlet tube 23 for solid particles is concentric.

A bearing 40 is provided for balls 41 and is securely attached to the outside of the tube 39 near its upper end. A slightly conical plate 42, having an opening at its center through which the tube 39 extends, is provided with a ball race near said opening which rests upon the balls 41. A deflection plate 43 is rigidly attached by connectors 44 to the conical plate 42. Its lower surface curves upwardly and outwardly from a central point and thence downwardly and outwardly to its edge. A projection 45 at the center of the upper side of the deflection plate 43 is securely attached to the end of a shaft 46 which is driven by motor 47, pulley 48, belt 49 and pulley 50. The balls 41 and bearing 40 support these parts.

Nested conical plates 51, 52, 53 and 54 are supported and driven by hollow shaft 57, pulley 58, belt 59, pulley 60 and motor 47. These plates are securely connected together by connectors 61 and the lower portions of these plates are more nearly horizontal than the upper portions thereof. Projections 62 and 63 are provided along the inclined portions of the lower side of plate 51 and the upper side of plate 54 to prevent the adjacent spaces from becoming clogged. Note Fig. 4 which is an enlarged fragmental view of plate 51 showing the projections 62. A vapor outlet O is provided above the conical plates 51 to 54.

A spring 64 is provided with its lower end resting on a bearing on plate 65 that is fixed in position. This spring 64 normally keeps the plates 51—54 in their uppermost position. Sleeve 67 integral with hollow shaft 57 surrounding shaft 46 is connected to the pulley 58 and a flange at the bottom thereof is pressed upwardly by the spring 64. Magnetically-operated or other sorts of hammers 70 are attached to the supports 71 on the bracket 72.

Figures 5, 9:
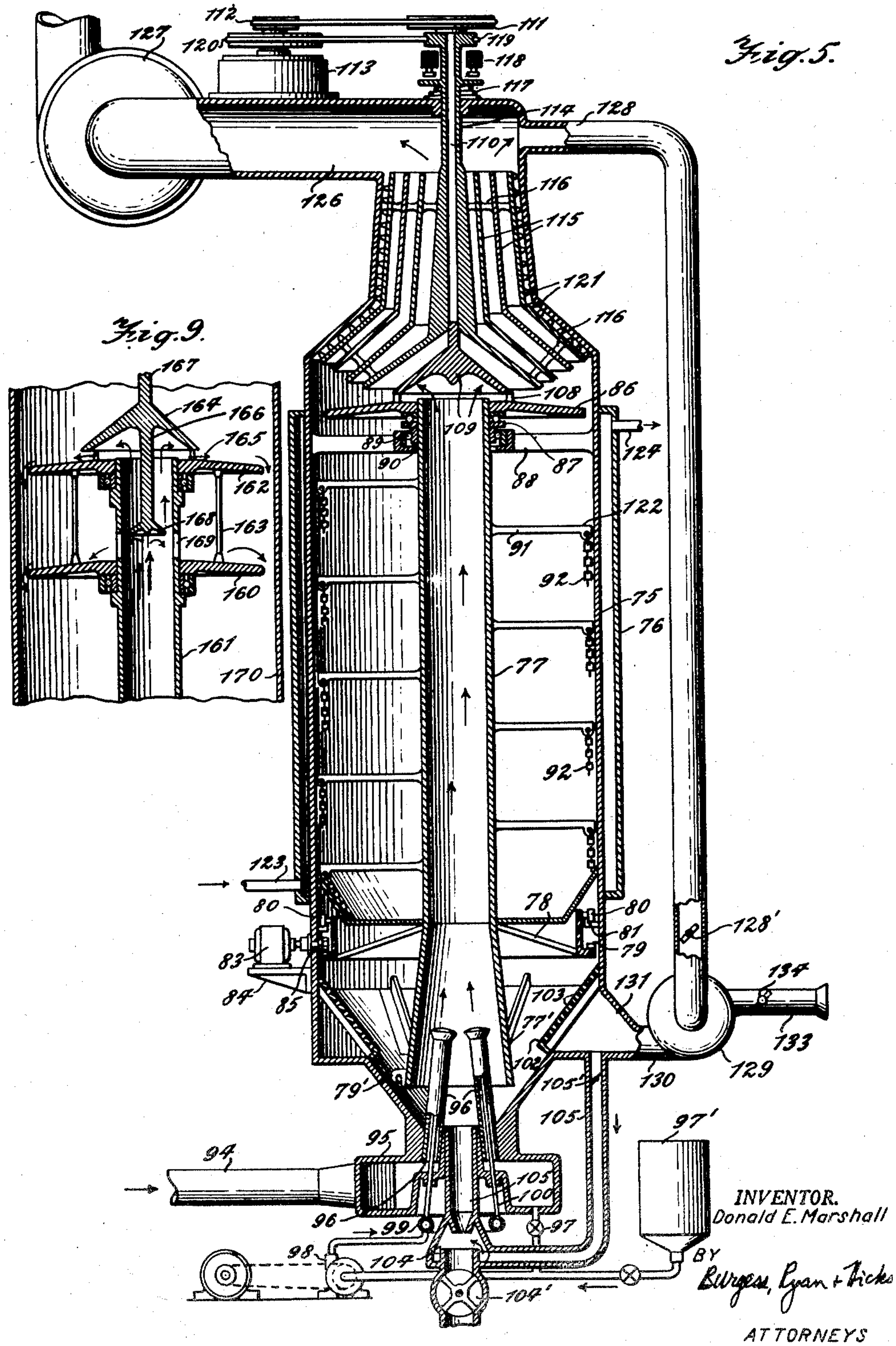
Fig. 5 is a view similar to Fig. 1 showing a modification.
Fig. 9 is a vertical section showing another modification of the structures of Fig. 1 and/or 5.

In the modification shown in Fig. 5, a chamber 75 is provided with a jacket 76. An upright revoluble tube 77 extends centrally of the chamber 75 and has a conical lower end 77′. A spider 78 is attached to the lower portion of the tube 77. A driving ring gear 79 is attached to the outer ends of spider 78. This ring gear 79 is provided with rollers 80 which rest on a runway 81 that is attached to the inside of the chamber 75. The ring gear 79 is driven by a gear on motor 83 which rests upon a support 84 outside of the jacket 76. A packing gland 85 is provided for the shaft of the motor 83. A scraper 79′ fastened to tube 77 revolves to clear space around the lower end of tube 77.

Centering arms 88 are attached to the chamber 75 for centering the tube 77. A roller bearing 89 is provided between the inner ends of the arms 88 and the bearing ring 90 that is attached to the outside of the tube 77. Radial arms 91 are attached to the tube 77 and carry chains 92 suspended from their outer ends.

A tangential inlet 94 is provided for material to be treated when it enters separator 95. Outlet tubes 96 for vapors extend from the separator 95 into the tube 77. A valved outlet 97 for liquids extends from the separator 95 to the pump 98 by which these liquids are forced into a ring tube 99 from which the tubes 100 extend into and nearly to the upper ends of the tubes 96 which lead from the upper side of the separator 95, leaving an annular space between the inside of the tubes 96 and the outside of the tubes 100.

Valved outlet 97 is also connected to supply tank 97′ as an alternate source for supplying liquid to pump 98.

Conical plate 86 is revolvably mounted on the open end of tube 77 and studs 108 connect the disk 86, which is a pelleting plate, to the pelton reflector cup 109. A shaft 110 is provided with a pulley 111 which is driven by a pulley 112 on a motor 113.

A hollow shaft 114 is mounted on the shaft 110. The shaft 114 carries a conically-shaped dust vane assembly consisting of concentric cones 115 that are held in assembled position by spacers 116.

A spring 117 is provided to keep this cone assembled in its uppermost position, but is permitted to be vibrated when struck by electromagnetic hammers 118. A pulley 119 that is smaller than the pulley 111 is driven by a pulley 120 of motor 113, which is larger than the pulley 112. Cleaning pins 121 are provided along the outer surface of the outer vane 115.

The jacket 76 around chamber 75 is provided with an inlet 123 and an outlet 124 for heating or cooling the chamber 75, as needed. An exhaust pipe 126 for vapor bearing air leads from the upper portion of the dust centrifuge 115 to an exhaust fan 127. A recycling exhaust duct 128 leads from above the dust centrifuge 115 to a recirculating fan 129, a valve 128' being provided in this pipe. An outlet 130 extends from the fan 129 to a plenum chamber 131 that surrounds the conical bottom of chamber 75 and tangential inlets 102 with baffles 103 open from the chamber 131 into chamber 75. A pipe 133 for auxiliary fresh air is provided for the fan 129 and a damper 134 is located in this pipe. A branch air line 105 from fan 129 provides elutriating air stream to annular opening 104 surrounding outlet 105 and valve 105' regulates this air. The air lock 104' discharges the products from chamber 75.

Figure 6:
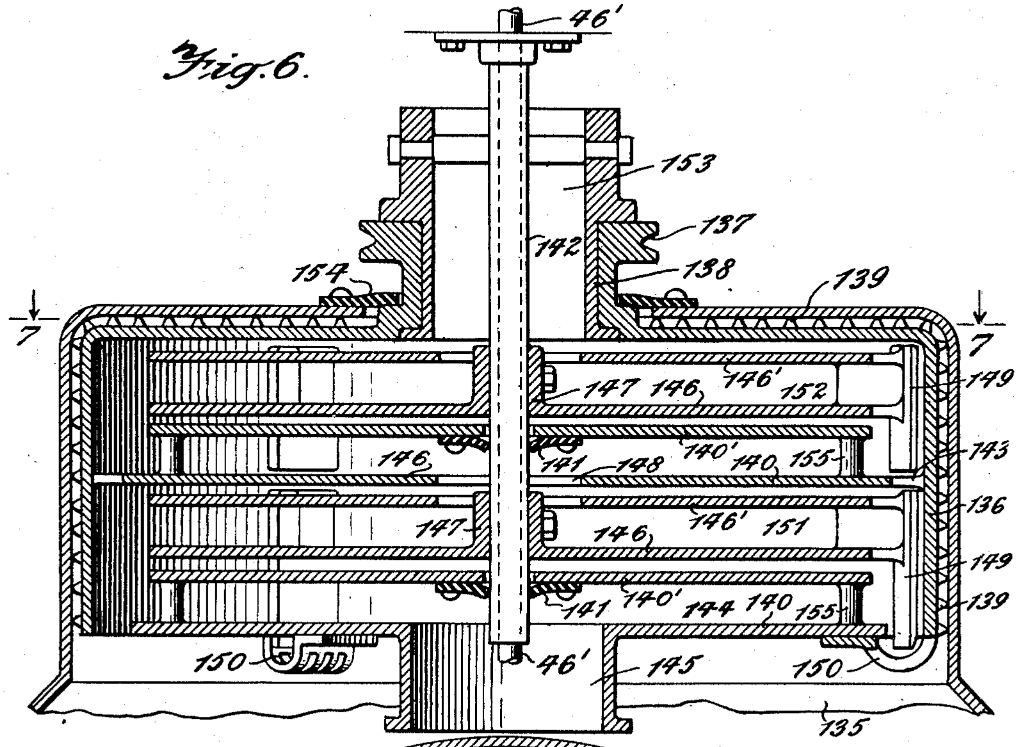
Fig. 6 is a vertical section of a modified dust or particle separator.
Figure 7:
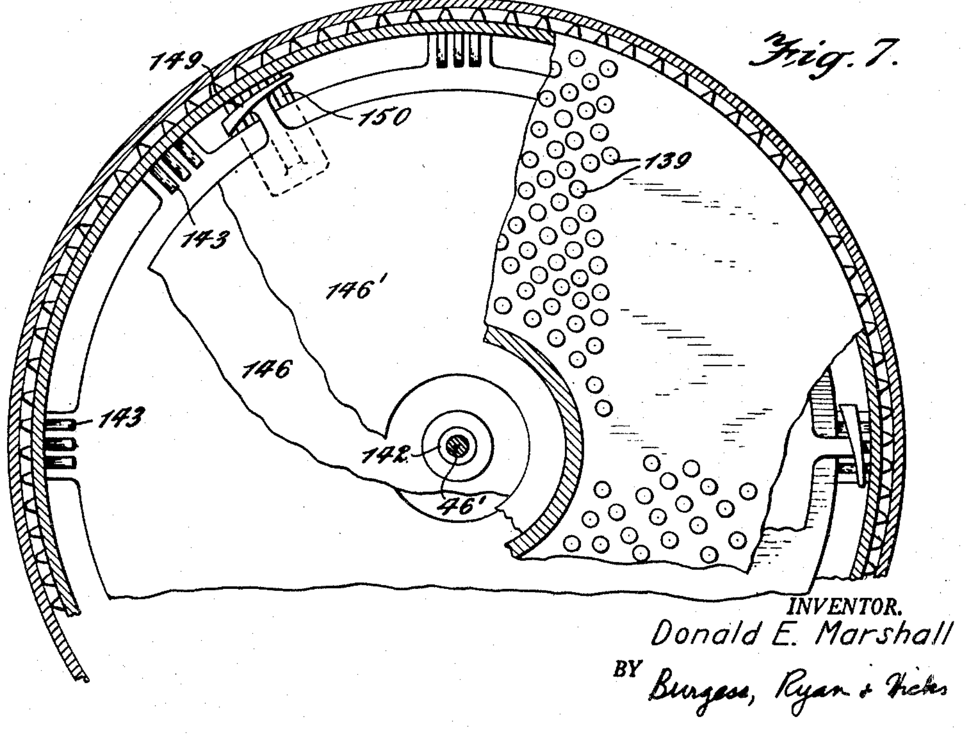
Fig. 7 is a section along the line 7—7 of Fig. 6.

A modified dust centrifuge is shown in Figs. 6 and 7, a chamber 135 is provided from which vapors entraining solids or dust are to be exhausted. A casing 136 is provided at the upper portion of the chamber 135. This casing 136 is to be revolved at a high speed. A pulley 137 is provided for revolving the casing 136. A bearing 138 is provided in which the pulley 137 revolves. Cleaning points or projections 139 are provided along the outside of the casing 136 to prevent dust from caking between the chamber 135 and the casing 136.

The revolving casing 136 is provided with attached disks 140' sealed by glands 141 from the stationary supporting shaft 142. The disks 143 support other disks 140' by studs 155 and are attached by vanes 143 to the casing 136. Revolving disks 140 and 140' provide an air passage 144 leading from inlet 145 to outer periphery of disks 140. A centrifugal air-flow is developed when disk 140 and casing 136 revolve.

Stationary disks 146 and 146' supported on shaft 142 by hubs 147 provide an air by-pass 151 from outer periphery of revolving disks 140 in the first stage to axial passage 148 which is the entrance to the second stage.

Integral with stationary disks 146 are mounted scrapers 149 arranged to plough collected dust from the inner surface of casing 136. Scrapers 149 are pitched so as to move ploughed dust downwardly from the second stage to the first stage through the openings between the vanes 143. Vanes 143 are also pitched to assist in transfer of dust between ploughs 149 of each stage.

Vanes 150 along the outer circumference of the bottom stage also are pitched to propel the dust from the centrifuge down along the wall of chamber 135. The uppermost stage of centrifugal disks 140 deliver through stationary passage 152 to outlet 153. Chamber 135 is sealed from revolving casing 136 by gland 154.

Figures 2, 3:
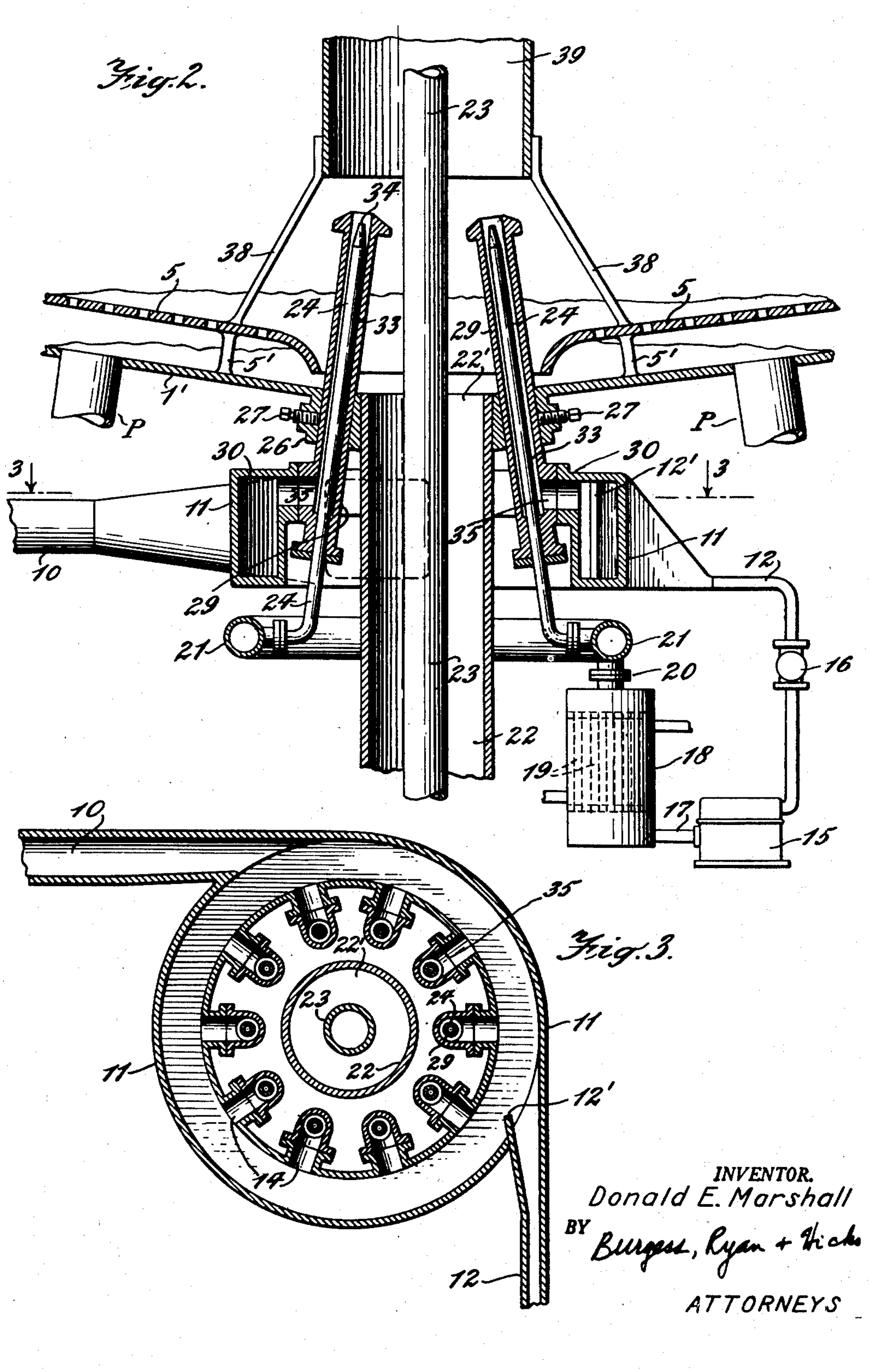
Fig. 2 is an enlarged, fragmental, sectional view of the construction of the lower portion of Fig. 1, again with auxiliary units in diagrammatic form.
Fig. 3 is a section along the line 3—3 of Fig. 2.
Figure 10:
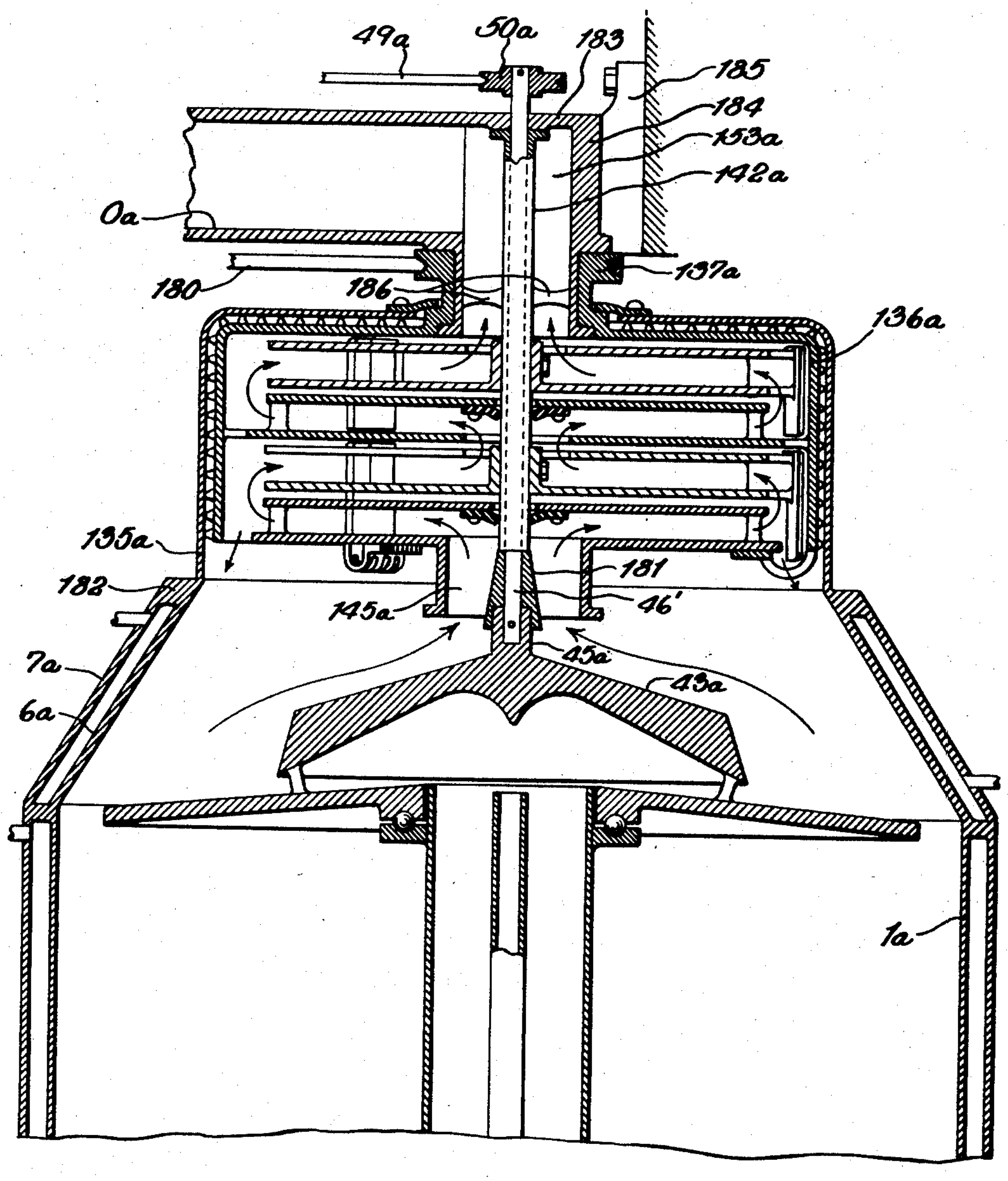
Fig. 10 is a vertical section of the apparatus shown in Fig. 1 except that the separator of the latter apparatus has been replaced by the separator shown in Fig. 6.

Stationary hollow support 142 provides for shaft 46' which corresponds to shaft 46 in Fig. 1. The centrifuge or separator of Figs. 6 and 7 may be described as a multi-stage centrifugal blower, or as bowl centrifuge means. As can be seen, the separator is multi-stage and has, roughly speaking, a bowl shape. As shown in Fig. 10, it may be substituted for the separator shown in the upper portion of chamber 1 of Fig. 1, where it will act to pump or draw out of the chamber the effluents from the tubes 23 and 39 and any fluidizing gas introduced through the inlets P. It further serves to separate such material into volatile and non-volatile parts, the latter being returned to the chamber, while the volatiles pass out through outlet 153. A belt 180 driven by means not shown serves to drive the pulley member 137*a*, and, of course, the revolvable casing 136*a*. As will be seen in Fig. 10, the deflector drive shaft 46', which extends through and is rotatable in the stationary tubular shaft 142*a*, is driven through the pulley 50*a* and belt 49*a* by a motor not shown. Shaft 142*a* has a lower enlarged portion 181 through which shaft 46' extends and into the lower recessed end of which the projection 45*a* of revolvable plate or deflector 43*a* extends. Shaft 46' is connected to the projection 45*a*. Portions 6*a* and 7*a* of chamber 1*a* are suitably attached to the outer casing 135*a* of the separator, as at 182. At its upper end shaft 142*a* is secured to the housing portion 183, as by being welded, and it may be further supported by the struts or braces 186 situated within the lower part of outlet 153*a*. Effluents from chamber 1*a* pass through inlet 145*a*, then through the separator, then outwardly through outlet 153*a* and duct 0*a*. A wall portion 184 of duct 153*a* is fastened to a suitable support 185.

All other parts of Fig. 10 correspond to similar parts shown in Figs. 1 and 6.

In the modification shown in Fig. 9 a multiple reflector and tumbling device is illustrated. The lower conical plate 160 is revolubly supported on draft tube 161 and is attached to the upper conical plate 162 by stay rods 163. The reflector 164 is driven by means not shown and drives the whole assembly through studs 165. An extension shaft 166 integral with drive shaft 167 supports a lower and partial reflecting cup 168. Openings 169 in the wall of tube 161 provide spaces for reflected material to be thrown out on lower conical plate 160 for pelleting.

The operation of the invention in accordance with the several embodiments described above can be performed using liquid input material carrying solids in suspension or solution. The operation will be particularly described in detail in connection with one of the embodiments of the apparatus described above. From this description it will be obvious how the invention can be practiced by using the other apparatus or devices that have been described.

Figure 8:
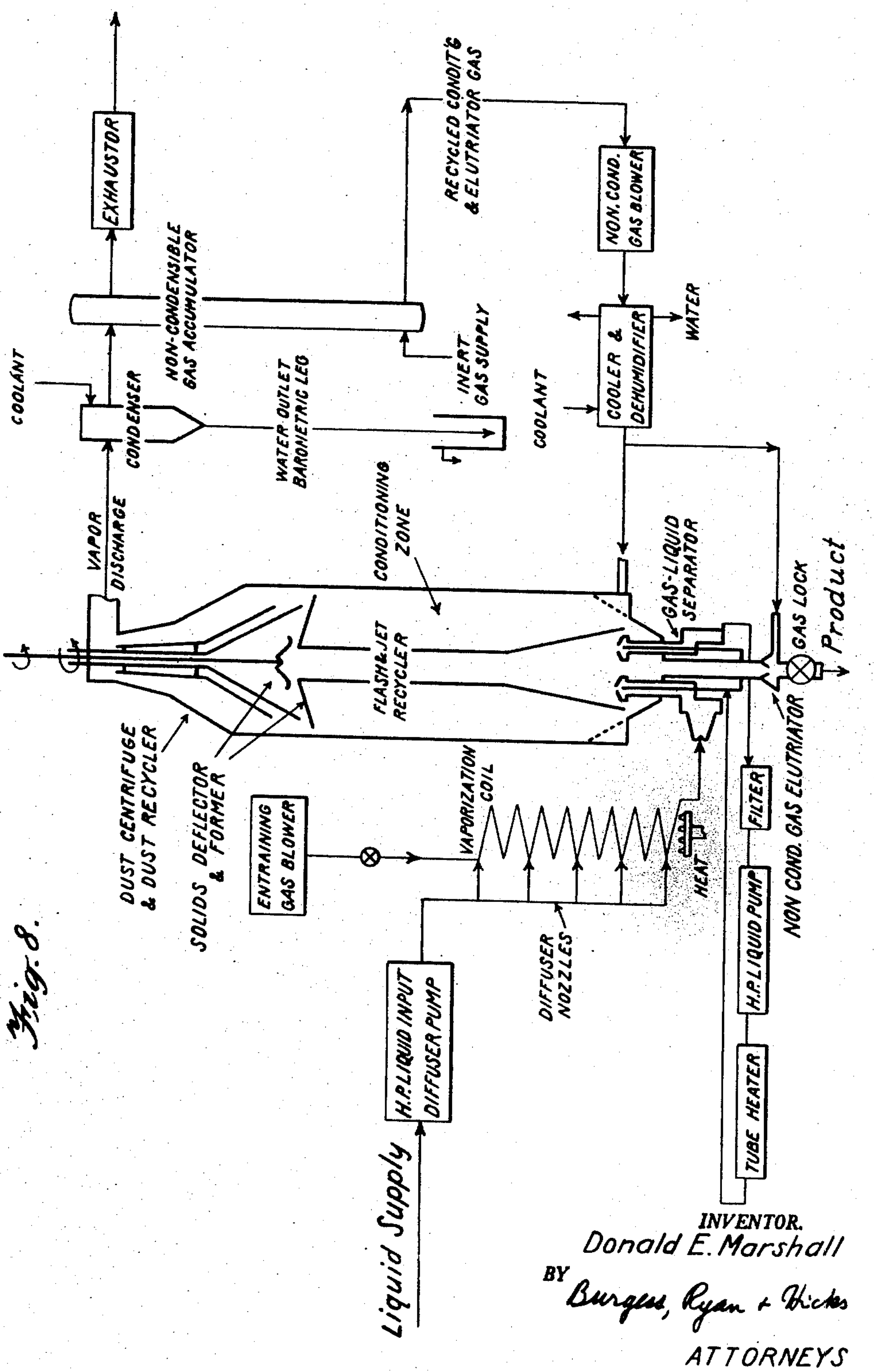
Fig. 8 is a diagram or flow chart illustrating a way of carrying out the process.

The preparation of the material to be treated may be carried out as shown diagrammatically in Fig. 8. The liquid mixture or solution or composition to be treated is introduced by a high pressure liquid diffuser pump which atomizes the material at the diffuser nozzles into the vaporization coil. Heat is added to the input liquid and entraining gas and to the vapors and liquids in the vaporization zone. The vapors are allowed to expand in the vaporization coil and supplement the entraining gas to develop a high-speed input stream to supply inlet 10 (Fig. 1). The input material enters inlet 10 partially in gas phase and partially in liquid-phase in which solids may or may not be suspended.

Toroid chamber 11 (Fig. 1) serves as a centrifugal separator. The gases or vapors fan out through tubular extensions 30 (Fig. 2) to extension 29 through annular spaces 33 to form a cylindrical envelope around the atomizing nozzle tips 34.

The liquids pass out of outlet 12 through filter 16 to high pressure liquid pump 15 and tubular heat exchanger 18 and bustle 21 thence out through tubes 24. This liquid is atomized by hydraulic pressure induced by pump 15 at nozzle tips 34 inside of the incoming vapor streams.

The vapor and atomized liquid input stream emanating from nozzles 29 and 24 develop an upward jet induced conveyor stream in sparger or draft tube 39 around solid particle input tube 23.

Within this tube 39 the temperature is lowered by flashing of unvaporized input, by the cooling air streams from the elutriator below and by conduction from recycled solid particles so as to congeal the solidifiable material in the input stream. Atomized liquid-phase material coats the recycled solid particles and is carried on the surfaces to assist in nucleation of dust on recycled solid particles and to condition particles for pelleting and forming. Previously formed solid particles from multi-stage process can be introduced through tube 23.

The upward flowing gas and solids stream in tube 39 is reflected by the spinning surface 43 which propels the heavier particles out and down in a counter flowing direction to separate them from the lighter dust and gases.

The reflected solid particles are tumbled on the spinning plate 42 to shape and compact them into pellets. Also, the centrifugal forces propel these pellets out and down the wall of the chamber 1 forming a barrier between the outer circumference of plate 42 and the chamber wall of the propelled solid particles which bounds the conditioning zone below.

The accumulated bed of reflected solid particles below this barrier is conditioned by cooling and drying gas introduced through inlets P. Violent aeration of this bed of accumulated solid particles is possible for conditioning and classification without serious loss of solids through the barrier of counter flow solids and above, yet allowing the gases to discharge.

The accumulated bed of aerated solids flows or is induced into jet conveyor stream up tube 39 to be re-coated with input liquid or nucleated with smaller particles.

An elutriating gas stream is introduced to the lower end of discharge tube 22 (Fig. 8) and emerges at 22′ (Fig. 2) to supplement the streams from nozzles 34 passing upwardly through tube 39.

The recycling particles are classified at the bottom of the chamber 1. The lighter are swept up the draft tube 39 and the heavier particles which tend to collect along the surface of the plate 5 fall down counter to the elutriating gas stream from tube 22 and are discharged out through the lower end of tube 22, according to predetermined size balanced with elutriating gas flow.

The lighter dust and gases which separate from the reflected solids stream on plate 42 are swept upwardly to dust centrifuge and outlet "O." The spinning vanes 51—54 of the centrifuge develop a friction with escaping gases and induce a centrifugal flow which throws out the entrained dust particles to the outer circumferences of the spaces between vanes 51—54 and deposits their dust on these surfaces by centrifugal force. The hammering mechanism 70 jars the spinning vane assembly 51—54 in a manner which dislodges the accumulated solids or dust particles and causes them to move by gravity and centrifugal force down and off of the outer periphery of these vanes. These dislodged accumulations are propelled directly into the recycled main solids stream from plate 42 and become trapped below the barrier of counter flowing solid particles and thence is recycled with the solids stream to be nucleated into larger particles.

The gases induced by an exhausting fan similar to the one shown as 127 in Fig. 5 pass through the dust centrifuge and are discharged dust-free from the chamber.

It is obvious that with this apparatus high velocities of gas flow and hence intesified evaporation is accomplished in a compact chamber by virtue of the counter inertia imparted to the separated solids by the mechanical forces of the spinning deflector plates and vanes which develop centrifugal forces several times that of gravity to counteract the entrainment of high velocity gas flow.

In the modification of the invention shown in Fig. 5 the recycled particles are allowed to fall freely below the recycling barrier through a conditioning zone where recycled gases are taken from exhaust through duct 128 and introduced at the bottom of chamber 75 in cyclonic direction through inlets 103 and by baffles 102. Cooling air or drying air may also be introduced through inlet 133 to properly condition the particles in their fall.

No accumulation of recycled particles is permitted at the bottom of the chamber 75 and the interior walls are swept clean by chain drags 92. The elutriating gas is supplied through duct 105 from blower 129 and to the discharge duct 105. The proper sized particles fall counter to the elutriating gas and out through the air lock 104′.

This modified apparatus and process holds solid particles in free gas suspension throughout most of their travel and develops nucleated particles in a manner similar to the steps in formation of hail stones in nature wherein rain drops are carried in strong up drafts to a cold zone, congeal and fall only to be caught in another up draft where more rain accumulates and solidifies until the hail stones become heavy enough to fall to earth despite the strong upward air current.

Conventional spray-drying or flash-drying can be practiced in this modified form of apparatus by introducing all of the liquid being treated from supply tank 97′ to liquid pump 15 and heating in tube heat exchange 18 as shown in Fig. 1 and atomizing the whole input at nozzle tips 34 (Fig. 2) enveloped in a cylindrical high velocity hot air stream from tubes 29 having been supplied through duct 10.

A modification of reflecting and forming mechanism is illustrated in Fig. 9 showing how two or more barriers of recycling solids can be obtained by using two or more reflectors 164 and 168. Reflector 168 throws out a portion of the upward input stream and allows the balance to pass to the second reflector 164. Both spinning conical plates 160 and 162 develop a solids stream barrier between their peripheries and the chamber wall 170 through which conditioning gases must pass to escape.

Negative pressure operation can be described by reference to Fig. 8. Input liquid is atomized into the vaporizing coil and at negative pressure and with the aid of some heat a gas stream is developed without the aid of auxiliary entraining gas. In other respects the input systems operate the same with the input streams being induced by the exhauster. The reaction zone operates the same way except that higher velocities of gas must make up for lower mass of gas in order to convey the solid particles upwardly.

The exhausted vapors are condensed by cooling and water is removed down a barometric leg. The non-condensible gases pass to an accumulator and out through exhausting ejector or vacuum pump. Conditioning gas is recycled through cooler de-humidifier and is introduced into the bottom of conditioning zone in a manner that conditions falling particles for recycling. Since these non-condensible gases are of low mass at negative pressure it is best not to attempt to aerate a bed of these accumulated solid particles. The elutriating gas supply is taken from the recycled non-condensable gas stream and may serve to cool and support larger particles to some extent, but here again the mass of gas must be offset by high velocity which adds a jet to draft tube conveying particles to top of chamber.

These high velocity gases will have less tendency to entrain dust from chamber due to larger differential in mass between gas and particle so that the same centrifugal forces will accommodate higher gas velocities of a lighter gas. Since no entrainment gas is introduced and the expanded vapors furnish the gas streams required to convey particles up the draft tube, no additional load is placed on the exhausting system over that required by a conventional vacuum spray drier, yet the surface exposure and particle formation and small reaction chamber gives many advantages in economy and quality of finished product.

This application is a division of copending application Serial Number 654,996, filed March 16, 1946.

In the light of the foregoing description, the following is claimed:

1. Apparatus for producing pelleted solid particles comprising a single chamber; an upstanding tube centrally located in said chamber; means for jetting a stream of gas suspended volatile material and solids into the lower portion of said tube for passage therethrough; rotatable deflecting means adjacent the upper end of said tube for separating solids from volatile material after passage of the same through said tube; rotatable means adjacent said deflecting means for receiving, pelleting and whirling the separated solids outwardly in the form of a layer of particles concentric with said central tube; a fluidizing zone surrounding said tube and below said layer of whirling particles for receiving said particles; means for fluidizing the particles in said fluidizing zone; means for returning fluidized particles from the fluidizing zone to the lower portion of said central tube for contact with said suspended stream; means for removing volatile material from the chamber; and means for removing solid particles from the chamber.

2. Apparatus for producing compact solid particles from a solution containing said particles dissolved or suspended therein comprising a single chamber; an upstanding rotatable tube in said chamber; means for jetting a stream of said solution suspended in gaseous material into the lower portion of said tube for passage therethrough; deflecting means adjacent the upper portion of said tube for separating solid particles from volatile material after passage of the same through said tube; rotatable means adjacent said deflecting means for receiving and compacting the separated solid particles; a collecting zone adjacent said tube through which the particles may fall freely; means for aerating the freely falling particles in said collecting zone; means for returning the aerated particles from the collecting zone to the lower portion of said tube for contact with said gas jetted stream; means for removing volatile material from the chamber; and means for withdrawing solid particles from the chamber.

3. Apparatus for producing pelleted solid particles from a solution containing said particles dissolved or suspended therein comprising means for atomizing said solution into a carrier gas stream; means for heating and volatilizing a substantial portion of said atomized solution; means for separating the unvolatilized portion; means for increasing the hydraulic pressure and temperature of said separated unvolatilized portion; a single chamber having an upstanding sparger tube therein; means for re-combining said unvolatilized portion with the volatilized portion and the carrier gas and jetting the re-combined stream into the lower portion of said tube for passage therethrough; deflecting means adjacent the upper end of said tube for separating solid particles from volatile material after passage of the same through said tube; rotatable means adjacent said deflecting means for receiving, pelleting and whirling the separated solid particles outwardly in the form of a layer; collecting means adjacent said tube and below said layer of whirling particles for receiving said particles; means for fluidizing the particles in said collecting means; means for returning fluidized particles from the collecting means to the lower portion of said tube for contact with said jetted, re-combined stream; means for removing volatile material from the chamber; and means for withdrawing solid particles from the chamber.

4. Apparatus for producing pelleted solid particles from a solution containing said particles dissolved or suspended therein comprising a chamber; an upstanding sparger tube in said chamber; means for increasing the hydraulic pressure and temperature of said solution; means for atomizing said solution into a heated carrier gas stream to form a solution suspended in gaseous material; means for jetting a stream of said solution suspended in gaseous material into the lower portion of said tube for passage therethrough; deflecting means adjacent the upper end of said tube for separating solid particles from volatile material after passage of the same through said tube; rotatable means adjacent said deflecting means and outside of said tube for receiving, pelleting and whirling the separated solid particles outwardly in the form of a layer; a collecting zone adjacent said tube and below said layer of whirling particles for receiving said particles; means for fluidizing the particles in said collecting zone; means for returning fluidized particles from the collecting zone to the lower portion of said tube for contact with said stream; means for removing volatile material from the chamber; and means for withdrawing solid particles from the chamber.

5. Apparatus for producing compact solid particles from a solution containing solid matter comprising a single chamber; an upstanding draft tube centrally located in said chamber; means for jetting a stream of said solution in gas suspension into the lower portion of said tube for passage therethrough; separating means adjacent the upper end of said tube for separating solid particles from the stream after passage of the same through said tube; means for receiving and compacting the separated solid particles; a collecting zone adjacent said tube for receiving said compacted particles; means for fluidizing the particles in said collecting zone; means for returning fluidized particles from the collecting zone to the lower portion of said tube for contact with said stream; means for removing gaseous material from the chamber; multi-stage centrifugal blower and bowl centrifuge means within said single chamber for pumping said gaseous material from the chamber and separating any centrifuged solid particles from said pumped gaseous material and for returning said centrifuged solid particles to said collecting zone; and means for withdrawing the heavier solid particles from the chamber.

6. Apparatus for producing compact solid particles from a solution containing said particles dissolved or suspended therein comprising a single chamber; an upstanding sparger tube in said chamber; means for jetting a stream of said solution suspended in gaseous material into the lower portion of said tube for passage therethrough; deflecting means adjacent the upper end of said tube for separating solid particles from volatile material after passage of the same through said tube; rotatable means adjacent said deflecting means and outside of said tube for receiving and compacting the separated solid particles; a collecting zone adjacent said tube for receiving the separated particles; means for introducing a gaseous fluid to said collecting zone; means for returning the particles from the collecting zone to the lower portion of said tube for contact with said stream; means for removing volatile material from the chamber; and means for withdrawing solid particles from the chamber.

7. Apparatus for producing compact solid particles from a solution containing said particles dissolved or suspended therein comprising a single chamber; an upstanding sparger tube in said chamber; means for jetting a stream of said solution suspended in gaseous material into the lower portion of said tube for passage therethrough; deflecting means adjacent the upper end of said tube for separating solid particles from volatile material after passage of the same through said tube; rotatable means adjacent said deflecting means and outside of said tube for receiving and compacting the separated solid particles; a collecting zone adjacent said tube for receiving the separated particles; means for introducing a gaseous fluid to said collecting zone; means for returning the particles from the collecting zone to the lower portion of said tube for contact with said stream; means for removing volatile material including gases from the chamber; means for recycling at least a portion of the gases removed from the chamber to the lower portion of said collecting zone; and means for withdrawing solid particles from the chamber.

DONALD E. MARSHALL.

REFERENCES CITED

The following references are of record in the file of this patent:

UNITED STATES PATENTS

| Number | Name | Date |
|---|---|---|
| 1,894,623 | Lissman | Jan. 17, 1933 |
| 1,984,380 | Odell | Dec. 18, 1934 |
| 2,192,515 | Crane et al. | Mar. 15, 1940 |
| 2,314,986 | Johnson | Mar. 30, 1943 |
| 2,337,684 | Scheineman | Dec. 28, 1943 |
| 2,347,682 | Gunness | May 2, 1944 |
| 2,381,119 | Dill | Aug. 7, 1945 |
| 2,399,717 | Arveson | May 7, 1946 |